United States Patent [19]
Kato et al.

[11] Patent Number: 5,628,286
[45] Date of Patent: May 13, 1997

[54] VALVE TIMING CONTROL APPARATUS FOR ENGINE

[75] Inventors: Senji Kato, Aichi-ken; Nobuhisa Ohkawa, Toyota; Shigeru Sone, Toyota; Tadahisa Naganawa, Toyota; Yoshihito Moriya, Nagoya; Yoshiya Yamashita, Toyota; Hitoshi Uda, Toyota; Yuji Yoshihara, Toyota, all of Japan

[73] Assignee: Toyota Jidosha Kabushiki Kaisha, Toyota, Japan

[21] Appl. No.: 622,715

[22] Filed: Mar. 26, 1996

[30] Foreign Application Priority Data

Mar. 27, 1995 [JP] Japan ............................. 7-68322
Aug. 3, 1995 [JP] Japan ............................. 7-198830

[51] Int. Cl.⁶ ........................... F01L 1/34; F01L 13/00
[52] U.S. Cl. ........................... 123/90.15; 123/90.17
[58] Field of Search ........................ 123/90.15, 90.16, 123/90.17, 90.31

[56] References Cited

U.S. PATENT DOCUMENTS

| | | | |
|---|---|---|---|
| 5,243,935 | 9/1993 | Kano et al. | 123/90.17 |
| 5,271,360 | 12/1993 | Kano et al. | 123/90.17 |
| 5,333,577 | 8/1994 | Shinojima | 13/90.15 |
| 5,363,817 | 11/1994 | Ikeda et al. | 123/90.15 |
| 5,469,818 | 11/1995 | Yoshioka et al. | 123/90.15 |
| 5,482,012 | 1/1996 | Yoshioka | 123/90.15 |
| 5,522,352 | 6/1996 | Adachi et al. | 123/90.15 |

FOREIGN PATENT DOCUMENTS

| | | |
|---|---|---|
| 571023 | 11/1993 | European Pat. Off. . |
| 643201 | 3/1995 | European Pat. Off. . |
| 59-120707 | 7/1984 | Japan . |
| 63-131808 | 6/1988 | Japan . |
| 2272960 | 6/1994 | United Kingdom . |

*Primary Examiner*—Weilun Lo
*Attorney, Agent, or Firm*—Kenyon & Kenyon

[57] ABSTRACT

An improvement of a valve timing control apparatus for an engine is disclosed. The apparatus has an intake valve and an exhaust valve which are alternately opened and closed in a valve timing sequence according to a rotation of a cam shaft. A timing pulley mounted on the cam shaft has a housing accommodating a plunger movable therein and a sleeve secured to the cam shaft. The housing has a first and second pressure chambers defined by the plunger and sealed with respect to each other. The plunger is arranged to move in an axial direction to selectively advance and retard the cam shaft based on differential pressure between the first pressure chamber and the second pressure chamber. A controller controls an electromagnetic valve with a specific control value to adjust the fluid pressure to be supplied to the first and second pressure chambers to maintain the valve timing sequence converged to a target valve timing. The controller corrects the specific value based on a rotational speed of the engine when the plunger is in one of the extreme positions in the chambers, and adjusts the fluid pressures based on the corrected specific value.

18 Claims, 7 Drawing Sheets

VALVE TIMING CONTROL APPARATUS FOR ENGINE

BACKGROUND OF THE INVENTION

1. Field of the Invention

The present invention relates to an adjustable valve timing control apparatus for an engine.

2. Description of the Related Art

The intake valve and exhaust valve of an engine should be opened and closed at accurate times to efficiently accomplish the suction and exhaust in cylinders. The optimal valve timing varies according to the engine speed, engine load and the like. A variable valve timing mechanism which changes the phase of the intake-side cam shaft based on the low speed or high speed is employed to cope with such a variation.

Japanese Unexamined Patent Publication No. Sho 63-131808 discloses the above variable valve timing mechanism. According to this prior art, as shown in FIG. 7, a spool 103 is located between a housing 101, coupled to a pulley 100 which rotates in synchronism with the engine, and a valve-driving cam shaft 102. A spline 104 formed on the outer surface of the spool 103 is engaged with a spline 105 formed on the inner surface of the housing 101. A spline 106 formed on the inner surface of the spool 103 is engaged with a spline 107 formed on the outer surface of a housing 108. Therefore, the spool 103 transmits the rotation of the pulley 100 to the cam shaft 102 and moves in the axial direction of the cam shaft 102 with respect to the housing 101 and housing 108.

At least one of the engagement between the housing 101 and the spool 103 and the engagement between the spool 103 and the housing 108 is accomplished by a helical spline. The housing 101, spool 103, housing 108 and pulley 100 define a first pressure chamber 109 and a second pressure chamber 110 with the spool 103 in between. An electromagnetic oil control valve (hereinafter referred to as "OCV"), disposed in an oil passage which connects both pressure chambers 109 and 110 to an oil pump 111, is controlled by the duty cycle that is based on the running condition of the engine, thereby adjusting the hydraulic pressure to be supplied to the pressure chambers 109 and 110. Accordingly, the spool 103 is moved in the axial direction of the cam shaft 102 by the differential pressure between both pressure chambers 109 and 110. At the same time, the helical spline engagement of the spool 103 applies twisting force to the cam shaft 102 to advance or retard the cam shaft 102 with respect to the crankshaft by the pressures in the first pressure chamber 109 and the second pressure chamber 110. As a result, the valve opening and closing timings are adjusted.

To change the valve timing using this apparatus, the target valve timing to be controlled is computed based on the running condition of the engine. The feedback control of the OCV is executed so that the actual valve timing converges to the target valve timing. Further, when the actual valve timing coincides with the target valve timing, the OCV is controlled in the first duty cycle for holding the spool 103 at the position of coincidence. Consequently, the variable valve timing mechanism is maintained at the position where the actual valve timing matches with the target valve timing.

The aforementioned Japanese Unexamined Patent Publication No. Sho 63-131808 teaches nothing about the control for holding the spool 103 at the shifted position thereof when the spool 103 is moved, in order to retard the cam shaft 102 to its limit with respect to the crankshaft.

To control the target valve timing of the cam shaft 102 to the maximum lagged angle, for example, the OCV may be so controlled as to supply the operational oil only to the second pressure chamber 110. This control allows only the hydraulic pressure to be supplied to the second pressure chamber 110 to surely hold the spool 103 at the position in the first pressure chamber 109 at which it abuts on the housing 101.

But, this control does not supply the operational oil to the first pressure chamber 109 so that when the spool 103 is kept pressed against the housing 101, the operational oil in the oil passage that connects the first pressure chamber 109 to the oil pan completely escapes to the oil pan. Even if an attempt is then made to increase the pressure in the first pressure chamber 109 to shift the cam shaft 102 to the phase of the angle-advancing side, it would take time to fill the operational oil in the oil passage, thus resulting in a lower control response.

To overcome the aforementioned problem, the present applicant (assignee) has proposed a method of controlling the OCV according to a slightly-offset duty cycle when the spool is moved to a position for shifting the cam shaft 102 retarded to its limit with respect to the crankshaft. This control allows the operational oil to be supplied to the first pressure chamber 109 by the hydraulic pressure slightly lower than that in the second pressure chamber 110. It is thus possible to keep the spool 103 abutting on the housing 101 in the first pressure chamber 109. To move the spool 103 in the opposite direction, the OCV should be controlled to cancel the slight differential pressure between both pressure chambers 109 and 110. This control therefore has an excellent control response.

The above-described variable valve timing mechanism suffers a conventionally known and inherent problem such that noise is produced by the teeth of the spline coupling portions of the spool 103 and housing 101 and/or the spool 103 and housing 108 hitting one another due to the back lash. This noise becomes more prominent as the engine speed increases, and becomes uncomfortably large particularly when the acceleration pedal is thrust forward in the loadless state of the engine such as when a vehicle is stationary.

In consideration of the response of the cam shaft 102 with respect to the duty cycle for controlling the OCV, the above-discussed variable valve timing mechanism is so designed that the hydraulic pressure to be supplied to the first pressure chamber 109 stays slightly above the hydraulic pressure to be supplied to the second pressure chamber 110. In other words, the force that pushes the spool 103 against the housing 101 is small. The splines 104 and 106 of the spool 103 will not be pressed against the matching splines 105 and 107 with a large surface pressure. Therefore, this variable valve timing mechanism should still cope with the generation of the back-lash originated noise.

In the other variable valve timing mechanism proposed by the present applicant, the housing is fixed in this mechanism and faces the pulley with a slight clearance therebetween. As the spool moves, therefore, the housing 108 receives force from the spline coupling portions. Accordingly, the pulley moves to and hits the pulley. In addition to the back-lash originated noise, there may be produced a sound of abutment of the pulley against the sleeve as the spool moves to shift the phase of the cam shaft advanced or retarded with respect to the crankshaft.

SUMMARY OF THE INVENTION

Accordingly, it is a primary objective of the present invention to provide a valve timing control apparatus for an engine, which can suppress the generation of noise at the time the engine is running.

It is another objective of this invention to provide a valve timing control apparatus for an engine, which has an excellent response in a control mode.

It is a further objective of this invention to provide a valve timing control apparatus for an engine, which has an excellent engine combustion rate.

To achieve the above object, according to one aspect of this invention, there is provided a valve timing control apparatus for an engine. The apparatus has an intake valve and an exhaust valve alternately opened and closed in a valve timing sequence according to a rotation of a cam shaft coupled to a crank shaft by way of a rotatable member securely mounted on the cam shaft. The cam shaft is rotatable in synchronism with the crank shaft and the engine, and arranged to be selectively advanced and retarded between two opposite limits with respect to the crank shaft so as to converge the valve timing sequence to a target value computed based on a running condition of the engine detected by detecting means which includes a sensor for detecting a rotation speed of the engine. The apparatus has a sleeve secured to the cam shaft within the rotatable member, a first pressure chamber and a second pressure chamber sealed with respect to each other in the rotatable member, a hollow plunger movable between the first pressure chamber and the second pressure chamber, said plunger having an inner surface and an outer surface respectively in mesh with the sleeve and the rotatable member, said plunger being arranged to move in an axial direction between a first extreme position in the first pressure chamber and a second extreme position in the second pressure chamber to selectively advance and retard the cam shaft based on differential pressure between the first pressure chamber and the second pressure chamber, wherein said cam shaft is advanced to one of said limits when said plunger is in the first extreme position and retarded to the other one of said limits when the cam shaft is in the second extreme position. The apparatus further includes supplying means for supplying fluid pressure to the first pressure chamber and the second pressure chamber to move the plunger, a controller for controlling the supplying means, said controller computing a specific control value to adjust the fluid pressure to be supplied to the first pressure chamber and the second pressure chamber so as to keep the valve timing sequence converged to the target value. The controller corrects the specific value based on the detected rotation speed of the engine when the plunger is in one of the extreme positions, and adjusts the fluid pressures based on the corrected specific value.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A detailed description will be now given of a valve timing control apparatus for an engine according to the first embodiment of the present invention with reference to FIGS. 1 through 5.

Figure 1:
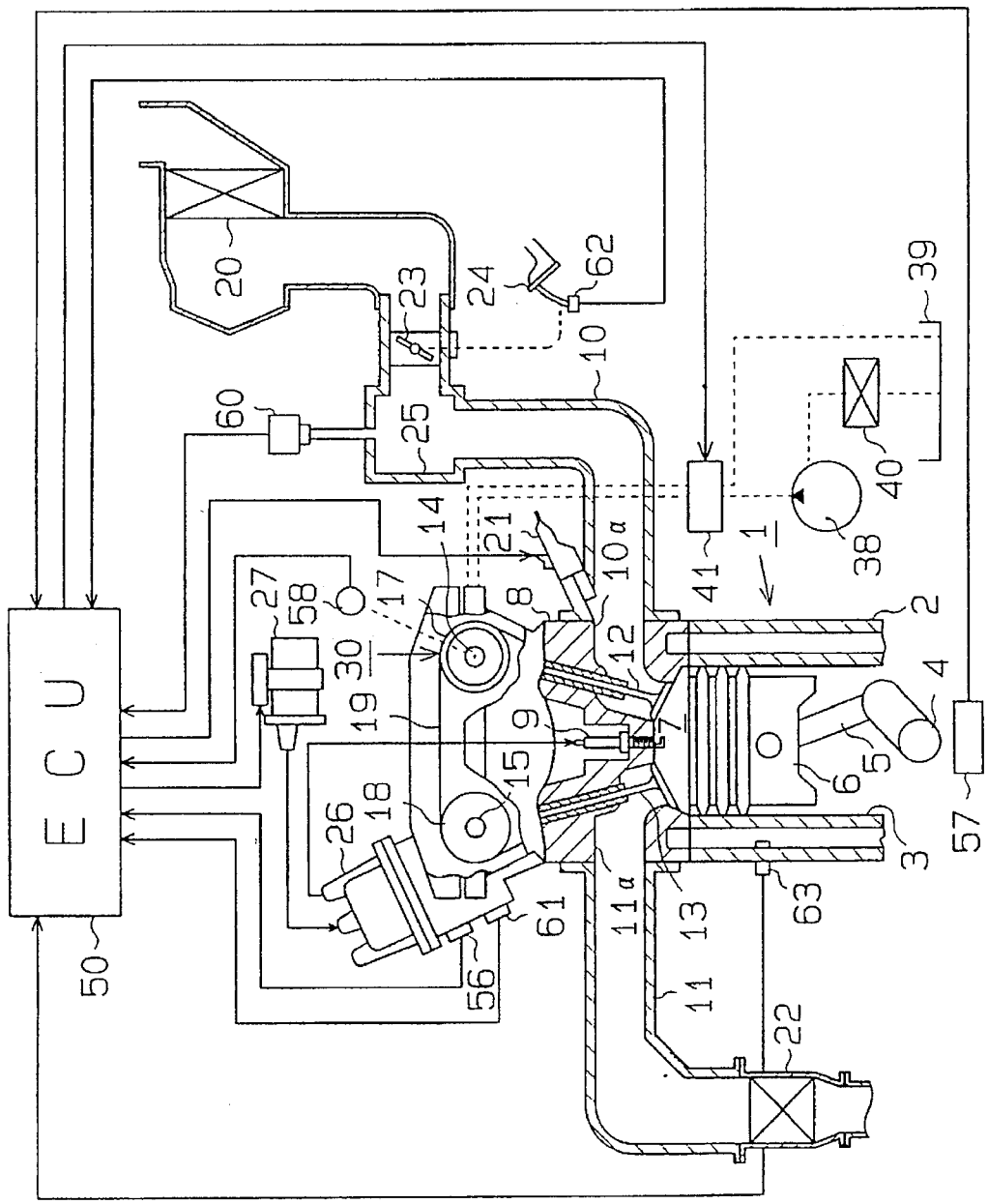
FIG. 1 is a schematic structural diagram illustrating an engine equipped with a variable valve timing mechanism (VVT) according to this invention.

FIG. 1 shows an engine 1 having a cylinder block 2 which includes a plurality of cylinder bores 3. A coolant temperature sensor 63 detects the temperature of the coolant that flows over the outer surface of the cylinder block 2.

Pistons 6 are disposed in the cylinder bores 3. The pistons 6 are supported on a crankshaft 4 by rods 5. A combustion chamber 7 in each cylinder bore 3 is covered with a cylinder head 8. A plurality of ignition plugs 9 respectively face the combustion chambers 7. An air-intake passage 10 is connected to the associated combustion chamber 7 via an intake port 10α, and is further connected to an exhaust passage 11 through the combustion chamber 7 via an exhaust port 11α.

An intake valve 12 and an exhaust valve 13 are respectively provided at the intake port 10α and the exhaust port 11α. A first cam shaft 14 and a second cam shaft 15, which are respectively associated with the intake valve 12 and exhaust valve 13, are supported rotatably about their axes between the cylinder head 8 and a bearing cap 16. The valves 12 and 13 are selectively opened and closed by way of unillustrated cams as the associated cam shafts 14 and 15 rotate. A first timing pulley 17 and a second timing pulley 18 are respectively provided at ends of the cam shafts 14 and 15. Both timing pulleys 17 and 18 are operably coupled to the crankshaft 4 by way of a timing belt 19.

When the engine 1 runs, therefore, the torque of the crankshaft 4 is transmitted via the timing belt 19 and both timing pulleys 17, 18 to the cam shafts 14, 15 based on whose rotations the intake valve 12 and the exhaust valve 13 are respectively actuated. The intake valve 12 and exhaust valve 13 are driven at predetermined timings in synchronism with the rotation of the crankshaft 4 or in synchronism with a sequence of four strokes of the engine, namely the suction stroke, the compression stroke, the combustion and expansion stroke, and the exhaust stroke.

An air cleaner 20 is provided in the vicinity of the inlet of the air-intake passage 10. Injectors 21 provided near the respective intake ports 10α inject fuel. When the engine 1 runs, the air is led via the air cleaner 20 into the air-intake passage 10. At the same time, the fuel is injected from each of the injectors 21 so that the fuel is mixed with the air. This air-fuel mixture is supplied into the associated combustion chamber 7 in synchronism with the opening timing of the associated intake valve 12.

The air-fuel mixture supplied into the combustion chamber 7 is ignited and burned by the associated ignition plug 9. The air-intake passage 10 is connected via the intake port 10α to the combustion chamber 7 through which the intake valve 10 is further connected via the exhaust port 11α to the exhaust passage 11. A catalytic converter 22, which is provided midway in the exhaust passage 11, cleans the exhaust gas with an incorporated catalytic converter rhodium.

A throttle valve 23 provided midway in the air-intake passage 10 is opened or closed in accordance with the manipulation of an acceleration pedal 24 to thereby adjust the amount of air taken into the air-intake passage 10. An idle switch 62 provided at the acceleration pedal 24 outputs an idle signal IDL when the acceleration pedal 24 is not manipulated, or when the threshold value 23 is closed. A surge tank 25, located downstream of the throttle valve 23, smoothes the air pulsation occurring in the air-intake passage 10. A manifold pressure sensor 60, communicating with the surge tank 25, detects a manifold pressure PM.

The ignition plugs 9 are connected via a distributor 26 with igniters 27. The distributor 26 applies a high voltage, output from each igniter 27, to the associated ignition plug 9 at the timing based on the rotational angle of the crankshaft 4. Therefore, the ignition timing of each igniter 27 is determined by the output timing for the high voltage output from the igniter 27.

A rotor (not shown) incorporated in the distributor 26 is coupled to the second cam shaft 15, and rotates in synchronism with the rotation of the crankshaft 4. An engine speed sensor 61 detects the number of the rotor's rotation, or the engine speed NE. A timing sensor 56 detects a reference position of the crankshaft 4 at a given rate in accordance with the rotation of the rotor. A crank angle sensor 57 detects the rotational angle of the crankshaft 4 based on the rate at which the reference position of the crankshaft 4 is detected by the timing sensor 56. A cam angle sensor 58 detects the angle of the first cam shaft 14. The engine 1 is coupled to an unillustrated automatic transmission system. A shift position sensor 59 (shown in FIG. 3) detects the position of the shift lever (shift position SP) of the transmission system of the engine.

A variable valve timing mechanism (hereinafter referred to as "VVT") 30 is disposed between the first cam shaft 14 and the timing pulley 17 to alter the opening and closing timings of the intake valve 12.

Figure 2:
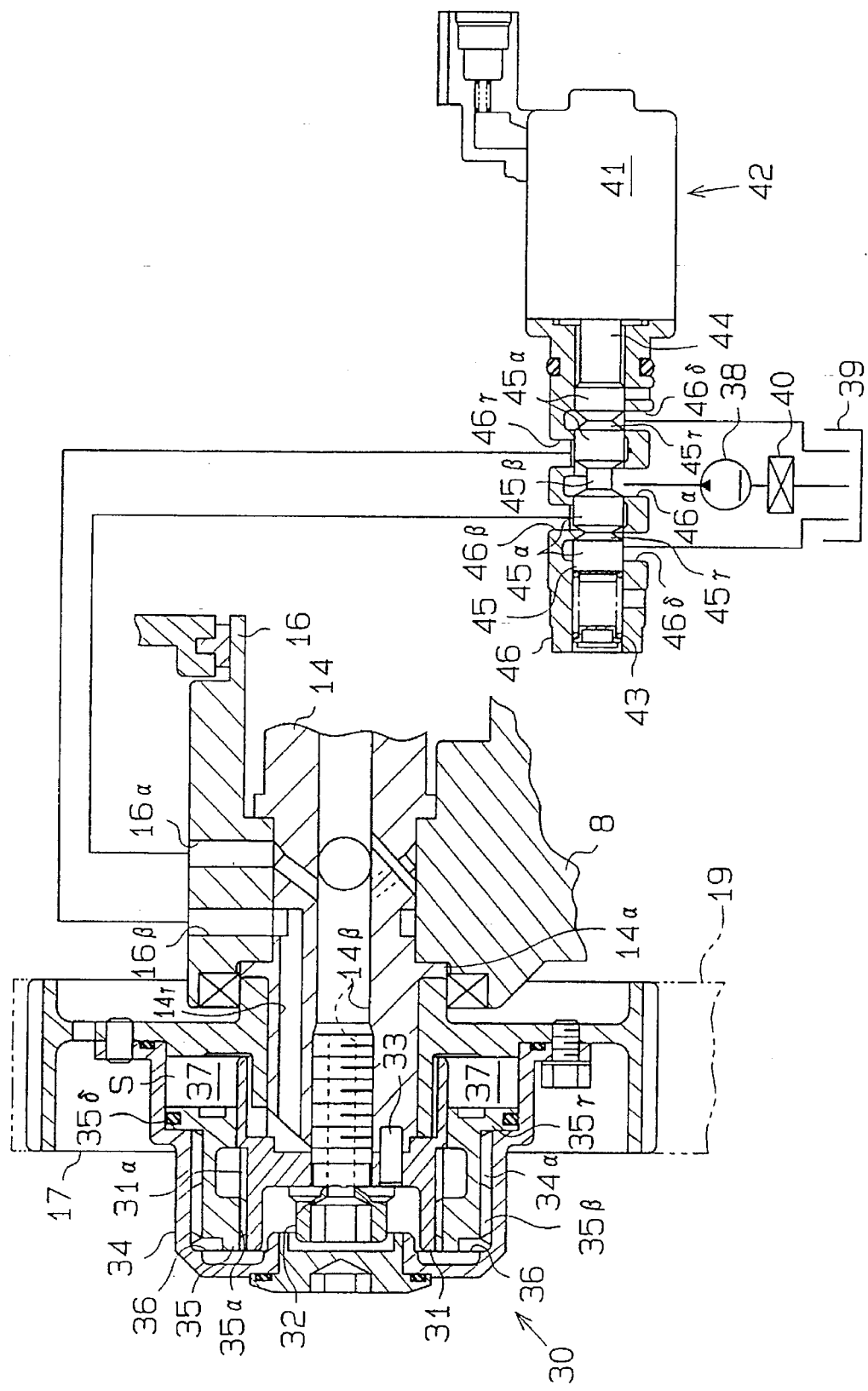
FIG. 2 is a schematic structural diagram showing the VVT and its peripheral structure.

As shown in FIG. 2, a cylindrical sleeve 31 is secured to the distal end of the first cam shaft 14 by a hollow bolt 32 and a pin 33 and is rotatable together with the cam shaft 14. A helical spline 31α is formed on the outer surface of the sleeve 31.

The first timing pulley 17 is fitted over the front outer surface of the first cam shaft 14, and is located between a flange portion 14α of the cam shaft 14 and the sleeve 31. The sleeve 31 faces the timing pulley 17 with a slight clearance therebetween so as not to interfere with the rotation of the timing pulley 17. A housing 34 secured to the front face of the timing pulley 17 surrounds the distal end of the cam shaft 14. Annular space S is defined by the inner surface of the housing 34 and the front surface of the timing pulley 17. A helical spline 34α is formed on the inner surface of the housing 34.

A plunger 35 disposed in the space S between the sleeve 31 and the housing 34 is movable in the axial direction of the cam shaft 14. An inner helical spline 35α of the plunger 35 is engaged with the helical spline 31α of the sleeve 31. An outer helical spline 35β of the plunger 35 is engaged with the helical spline 34α of the housing 34. The rotational torque of the crankshaft 4, which has been transmitted to the timing pulley 17, is transmitted to the first cam shaft 14 via the plunger 35 and the sleeve 31.

A flange portion 35γ is provided with the plunger 35. A seal member 35δ provided at the flange portion 35γ defines a space S. The space on the left side of the seal member 35δ is a first pressure chamber 36, while the space on the right side is a second pressure chamber 37.

First and second hydraulic pressure supply holes 16α, 16β are formed in the bearing cap 16. First and second hydraulic pressure supply passages 14β, 14γ are formed in the cam shaft 14. The first passage 14β connects the first hole 16α to the first chamber 36 via the hollow bolt 32, and the second passage 14γ connects the second hole 16β to the second chamber 37.

An oil pump 38, an oil pan 39, and an oil filter 40 supply the lubrication oil to the engine 1, and control the VVT. The first and second hydraulic holes 16α, 16β are connected to an outlet of the pump 38 via an electromagnetic oil control valve (hereinafter referred to as "OCV") 41. The OCV 41 is a 4-port direction valve which switches the direction of the flow of the oil as a plunger 44, which is driven by an electromagnetic actuator 42 and a coil spring 43, causes a spool 45 to reciprocate in the axial direction. As the actuator 42 is controlled according to the duty cycle, the angle of opening of each port is controlled to adjust the level of the hydraulic pressure to be supplied to the individual chambers 36 and 37.

A casing 46 of the OCV 41 has a tank port 46α, an A port 46β, a B port 46γ and a reservoir port 46δ. The tank port 46α is connected to the oil pan 39 via the pump 38, the A port 46β to the first hole 16α, and the B port 46γ to the second hole 16β. The reservoir port 46δ communicates with the oil pan 39.

The spool 45 has four lands 45α to block the flow of the oil between the two ports 46β and 46γ, a center passage 45β which connects the two ports 46β and 46γ to permit the flow of oil, and two passages 45γ located on both sides of the center passage 45β.

When the actuator 42 is driven with the 100% duty cycle and the spool 45 is moved leftward against the force of the spring 43, the passage 45β connects the port 46α to the port 46β to supply the oil to the first hole 16α. The oil enters the first chamber 36 via the first passage 14β, so that pressure is applied to the distal end of the plunger 35. At this time, the maximum amount (100%) of oil flows into the first hole 16α from the tank port 46α.

At the same time, the passage 45γ connects the port 46γ to the reservoir port 46δ so that the oil in the second chamber 37 is discharged to the oil pan 39 via the second hole 16β and the B port 46γ of the OCV 41. At this time, the maximum amount (100%) of oil flows into the reservoir port 46δ from the second hole 16β.

Therefore, the plunger 35 moves rearward at the maximum speed while rotating by the hydraulic pressure applied to its distal end, thus imparting twisting force to the first cam shaft 14 via the sleeve 31. As a result, the first cam shaft 14 is advanced with respect to the first timing pulley 17 or the crankshaft 4, and the intake valve 12 repeats to open and close fast. As the plunger 35 abuts on the timing pulley 17 in the second chamber 37, its further movement is restricted. When the plunger 35 comes to this position, the first intake valve 12 is driven at the fastest timing.

When the actuator 42 is de-energized or is driven with the 0% duty cycle, the spool 45 is moved rightward by the spring 43. Consequently, the center passage 45β connects the tank port 46α to the B port 46γ to supply the oil to the second hole 16β. The oil supplied to this hole 16β is supplied to the second chamber 37 via the second passage 14γ, thus applying pressure to the rear end of the plunger 35. At this time, the maximum amount (100%) of oil flows into the second hole 16β from the tank port 46α.

At the same time, the passage 45γ of the OCV 41 connects the A port 46β to the reservoir port 46δ. As a result, the oil in the first chamber 36 is discharged to the oil pan 39 via the first passage 14β, the first hole 16α, the A port 46β and the reservoir port 46δ. At this time, the maximum amount (100%) of oil flows into the reservoir port 46δ from the first hole 16α.

The plunger 35 moves frontward at the maximum speed while rotating by the hydraulic pressure applied to its rear end, thus imparting the opposite twisting force to the first cam shaft 14 via the sleeve 31. As a result, the first cam shaft 14 is retarded with respect to the crankshaft 4. The intake valve 12 repeats to open and close slowly. As the plunger 35 abuts on the inner wall of the housing 34 in the first chamber 36, its further movement is restricted. When the plunger 35 comes to this position of abutment, the intake valve 12 is driven at the fastest timing.

The stroke of the plunger 35 is changed by altering the duty cycle of the pulse current that drives the actuator 42 between 0% to 100%. Therefore, the flow rate of the oil between the first and second holes 16α and 16β and the tank port 46α, and the flow rate of the oil between the first and second holes 16α and 16β and the reservoir port 46δ vary between 0% to 100%, so that the moving speed of the plunger 35 toward the housing 34 or the pulley 17 is altered.

When the actuator 42 is controlled by a specific duty cycle GDVTH, the valve spool 45 is shifted to the position to close the A port 46β and B port 46γ via the lands 45α. Consequently, the oil flow between the first and second hydraulic holes 16α, 16β and the tank port 46α, and the oil flow between the first and second hydraulic holes 16α, 16β and the reservoir port 46δ are blocked, making the flow rate of the oil in those paths to 0%. The plunger 35 does not thus move (the moving speed of zero), and is held at that position. A signal corresponding to the specific duty cycle GDVTH is previously determined. The specific duty cycle GDVTH is updated by learning to eliminate an error which may be caused by the allowances and the time-dependence deterioration of the components of the VVT and/or OCV and some other reasons.

Figure 3:
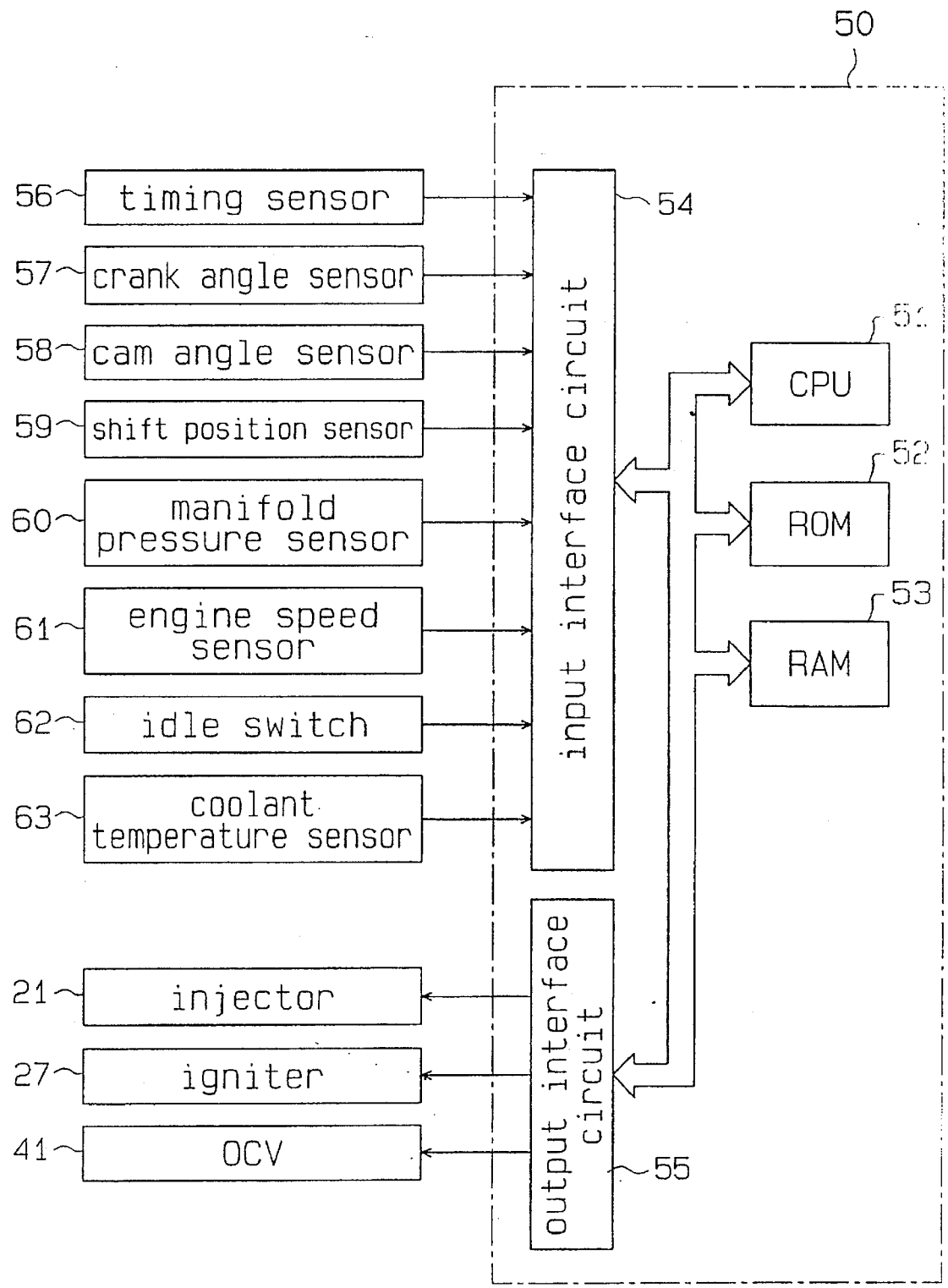
FIG. 3 is a block diagram showing the electric structures of an electronic control unit (ECU) which controls the VVT, sensors, etc.

The electric structure for controlling the VVT 30 will be now described with reference to FIG. 3.

An ECU 50 comprises a CPU 51, ROM 52, RAM 53, an input interface circuit 54 and an output interface circuit 55.

The timing sensor 56, crank angle sensor 57, cam angle sensor 58, shift position sensor 59, manifold pressure sensor 60, engine speed sensor 61, idle switch 62 and coolant temperature sensor 63 are connected to the CPU 51 via the input interface circuit 54. The OCV 41, i.e., the actuator 42, the injector 21, and the igniter 27 are connected to the CPU 51 via the output interface circuit 55.

The CPU 51 properly controls the fuel injection timings of the OCV 41 and injector 21, the ignition timing of the igniter 27, etc. in accordance with a control program stored in the ROM 52, based on signals from the various sensors 56–61 and the idle switch 62.

Figure 4:
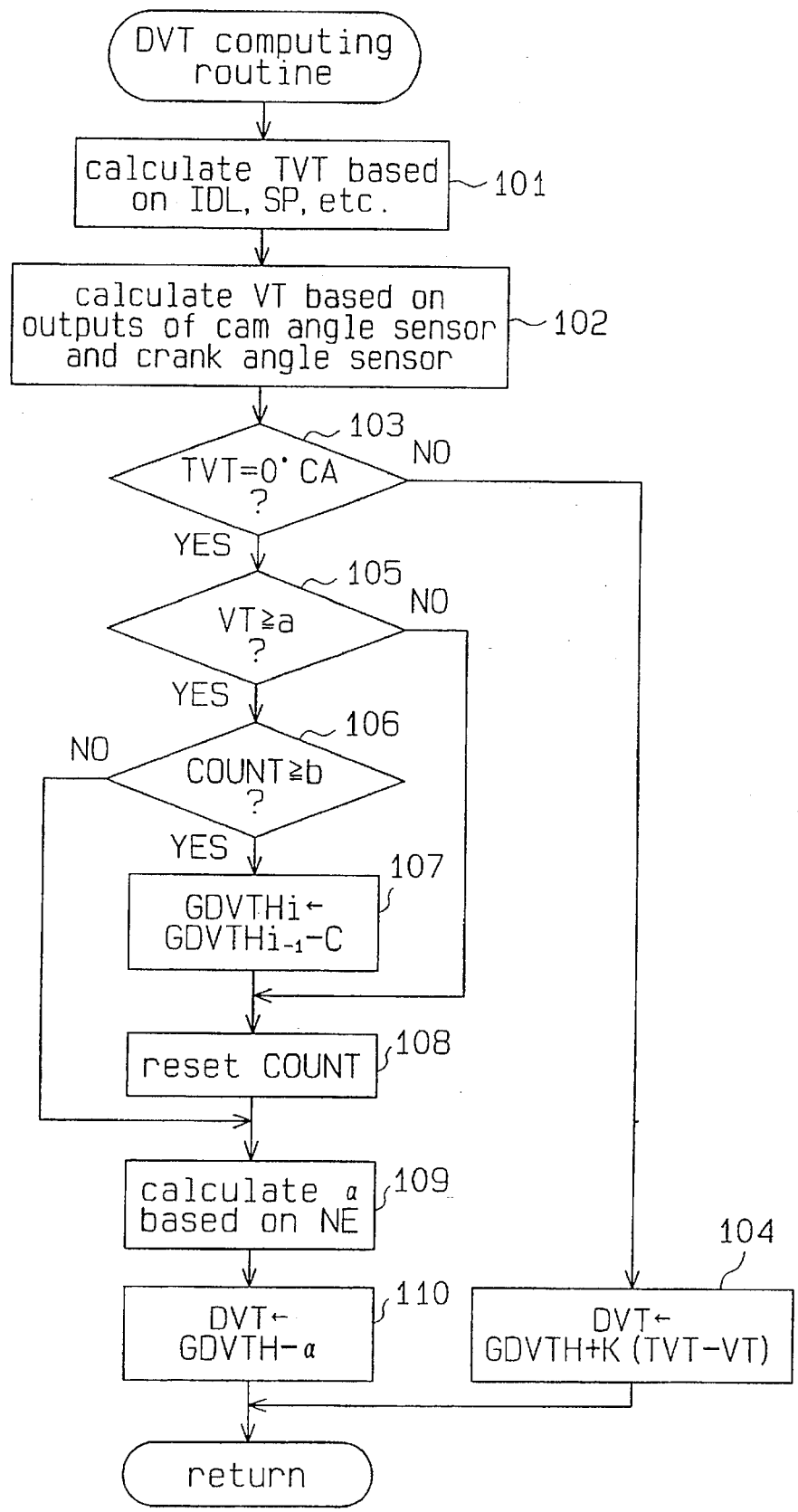
FIG. 4 is a flowchart illustrating a routine for computing the duty cycle in which the ECU controls an oil control valve (OCV) according to the first embodiment of this invention.

With reference to FIG. 4, a description will be now made of the program which is associated with the valve timing control in the valve timing control apparatus for an engine which has the above-described structure. This flowchart illustrates a routine for computing the drive duty cycle DVT for controlling the OCV 41.

In step 101, a target valve timing TVT is computed on the basis of the manifold pressure MP, idle signal IDL, shift position SP and engine speed NE, which are acquired from the shift position sensor 59, manifold pressure sensor 60, engine speed sensor 61 and idle switch 62. When the idle signal IDL is input from the idle switch 62 or the shift position SP detected by the shift position sensor 59 is "neutral" or "parking," the target valve timing TVT is specifically set equal to 0° CA (the slowest valve timing determined on the basis of the mechanical restriction of the VVT). The flow then proceeds to step 102 where the actual valve timing VT of the VVT 30 is calculated from the detected values from the cam angle sensor 58 and crank angle sensor 57.

The flow then proceeds to step 103 to determine if the target valve timing TVT is equal to 0° CA. When it is determined in step 103 that TVT≠0° CA, the flow proceeds to step 104 where a value obtained by the equation, GDVTH +K×(TVT−VT), is substituted to the drive duty cycle DVT. In this equation, GDVTH represents the aforementioned specific duty cycle for holding the plunger 35 at an arbitrary position and K represents a proportional control gain value.

As this drive duty cycle signal DVT is output, the feedback control of the VVT 30 is executed in such a way as to converge the actual valve timing VT to the target valve timing TVT. When the actual valve timing VT coincides with the target valve timing TVT (when TVT=VT), the specific duty cycle signal GDVTH is output. Accordingly, the VVT 30 is controlled based on the target valve timing TVT.

When TVT=0° CA or the target valve timing TVT is the slowest in step 103, it is determined in step 105 whether or not the actual valve timing VT≧a (° CA) where "a" is a threshold value for determining if the actual valve timing VT is the slowest. That is, this threshold value is for checking if the VVT 30, which is controlled with the drive duty cycle DVT computed in the subsequent steps, is ready to hold the cam shaft at the limit of the retarded phase.

When it is determined in step 105 that the actual valve timing VT is not the slowest, it is then determined in step 106 if the renewal timing for the specific duty cycle GDVTH is met. In other words, when the current valve timing TVT, not the previous target valve timing TVT$_{-1}$, is the slowest valve timing, the counting starts, and it is determined in step 106 if the count value COUNT is equal to or greater than a predetermined value (time) b.

When the decision in step 106 is YES, i.e., when it is determined in this step that the renewal timing has been met, the specific duty cycle GDVTH is updated in step 107. More specifically, a value obtained by subtracting a lagging offset amount c (predetermined value) from the previous duty cycle GDVTH$_{i-1}$ is set as a new specific duty cycle GDVTH$_i$ to correct the enablement that involves the very large specific duty cycle GDVTH.

When the process in step 107 is completed, or when the actual valve timing VT lies within the threshold value a in step 105, the flow goes to step 108 where the value COUNT is reset and counting of the renewal timing starts all over again.

Figure 5:
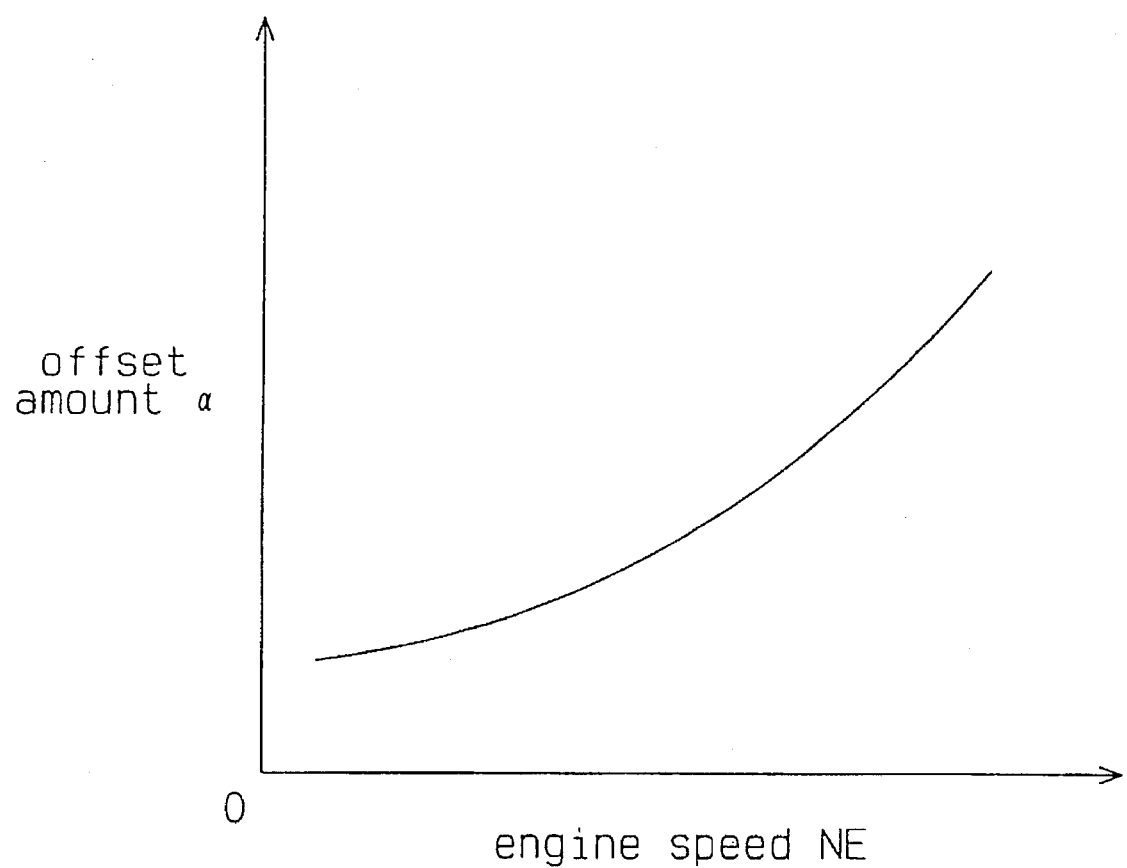
FIG. 5 is a graph showing the relationship between an offset amount α of the spool of the VVT and an engine speed NE.

When the decision in step 106 is NO or after the execution of step 108, an offset amount of the plunger 35 toward the housing 34, i.e., an offset value α of the cam shaft retarded with respect to the crankshaft is computed from the engine speed NE in step 109. As shown in FIG. 5, the offset amount α becomes smaller when the engine speed NE is equal to or smaller than a predetermined value and becomes larger when NE is greater than the predetermined value. More specifically, the offset amount α (the force of pressing the plunger 35 against the housing 34) is altered in accordance with the engine speed NE. The difference between the hydraulic pressures in both chambers 36, 37 becomes smaller when the engine speed NE is low than when the engine speed NE is high. When the engine speed NE is low, therefore, the hydraulic pressure for pressing the plunger 35 against the housing 34 becomes smaller than the force when the engine speed NE is high. When a vehicle starts moving from the stopped state (low speed), for example, the OCV 41 should be controlled to cancel the small hydraulic pressure difference between both chambers 36, 37 in order to shift the VVT 30 to advance a cam shaft with respect to the crankshaft. The control response of the VVT 30 is therefore improved.

The flow then moves to step 110 where a value obtained by subtracting the offset amount α from the specific duty cycle GDVTH is substituted to the drive duty cycle DVT for controlling the cam shaft at the maximum retarded phase.

In accordance with the drive duty cycle DVT calculated in the above manner, the OCV 41 is controlled to hold the cam shaft retarded to its limit with respect to the crankshaft. That is, if the OCV 41 is controlled with this duty cycle DVT, the hydraulic pressure in the second chamber 37 becomes greater than that in the first chamber 36 and the differential pressure between both chambers 36, 37 increases in proportional to the offset amount α. Consequently, the differential pressure between both pressure chambers 36 and 37 presses the plunger 35 to the position where the plunger 35 abuts on the housing 34 and holds the plunger 35 there.

As apparent from the above, it is possible to execute the optimal control for holding the VVT 30 so as to retard the cam shaft to its limit according to the engine speed NE.

The following will describe the key points in the control according to this embodiment. When the specific duty cycle GDVTH is too large, the desired force to press the plunger 35 against the housing 34 and hold it there cannot be acquired, and what is more, if the amount of the shift is greater than the offset amount α, the plunger 35 may be shifted toward the pulley when the signal of the drive duty cycle DVT is output. In this respect, it is checked in step 105 whether or not the spool 35 of the VVT 30 is abutting on the housing 34 when the cam shaft is at the maximum retarded phase.

Then, the specific duty cycle GDVTH which has become too large is corrected to retard the cam shaft in step 107. In other words, the previous specific duty cycle GDVTH$_{i-1}$ plus the compensation offset (c) is set as an updated new specific duty cycle GDVTH$_i$ in step 107. Thus, the computed specific duty cycle GDVTH is the proper value to advance the cam shaft, so that the plunger 35 can be surely held at the desired position.

When the valve timing TVT in the current routine, not in the previous routine, is the valve timing (0° CA) for retarding the cam shaft to its limit, the mechanical response of the VVT 30 is delayed so that the VVT 30 is controlled with the previous target valve timing TVT. It is therefore determined in step 105 that the actual valve timing VT computed in step 102 is greater than the threshold value α. The specific duty cycle GDVTH, which is the correct value, is erroneously updated in step 107. The control routine would be repeated multiple times while the delayed mechanical response of the VVT 30 to the above-described electric control is reflected on the actual valve timing VT based on the correct specific duty cycle GDVTH that has been computed in step 110.

According to this embodiment, however, the specific duty cycle GDVTH is not updated unless (COUNT≧b) is met within the set renewal timing for the specific duty cycle GDVTH. In the first routine (the very first routine in the same control that will be continuously repeated multiple times thereafter) where the target valve timing TVT becomes 0° CA, therefore, the flow proceeds to step 109 without waiting for the elapse of the predetermined time b in step 106. No unnecessary renewal of the specific duty cycle GDVTH will be executed. Because the time b during which the result of updating the specific duty cycle GDVTH is reflected in step 106, the next renewal of the specific duty cycle GDVTH is adequately performed in consideration of the delayed response of the VVT 30.

Figure 6:
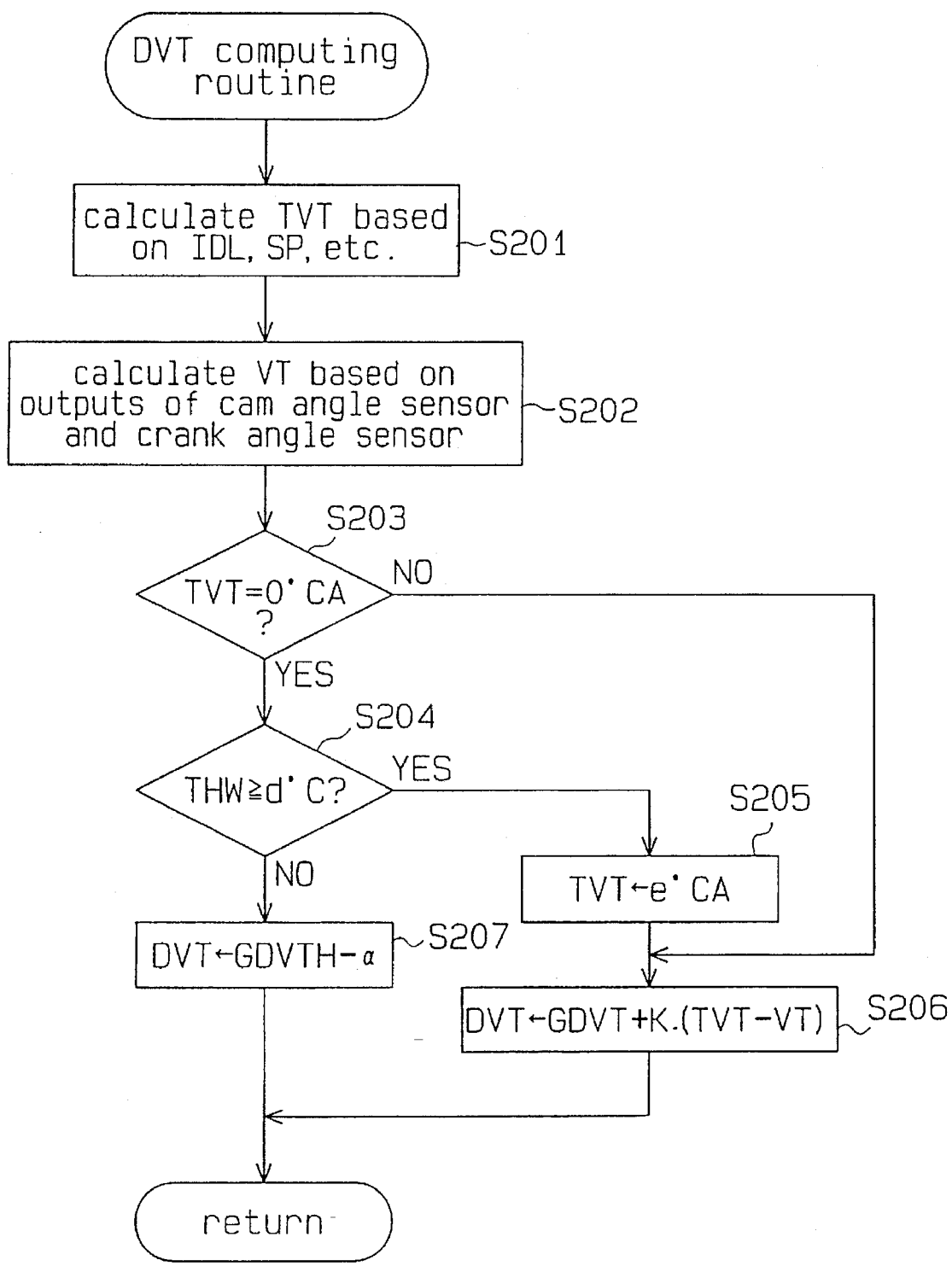
FIG. 6 is a flowchart illustrating a routine for computing the duty cycle in which the ECU controls the OCV according to the second embodiment of this invention.
Figure 7:
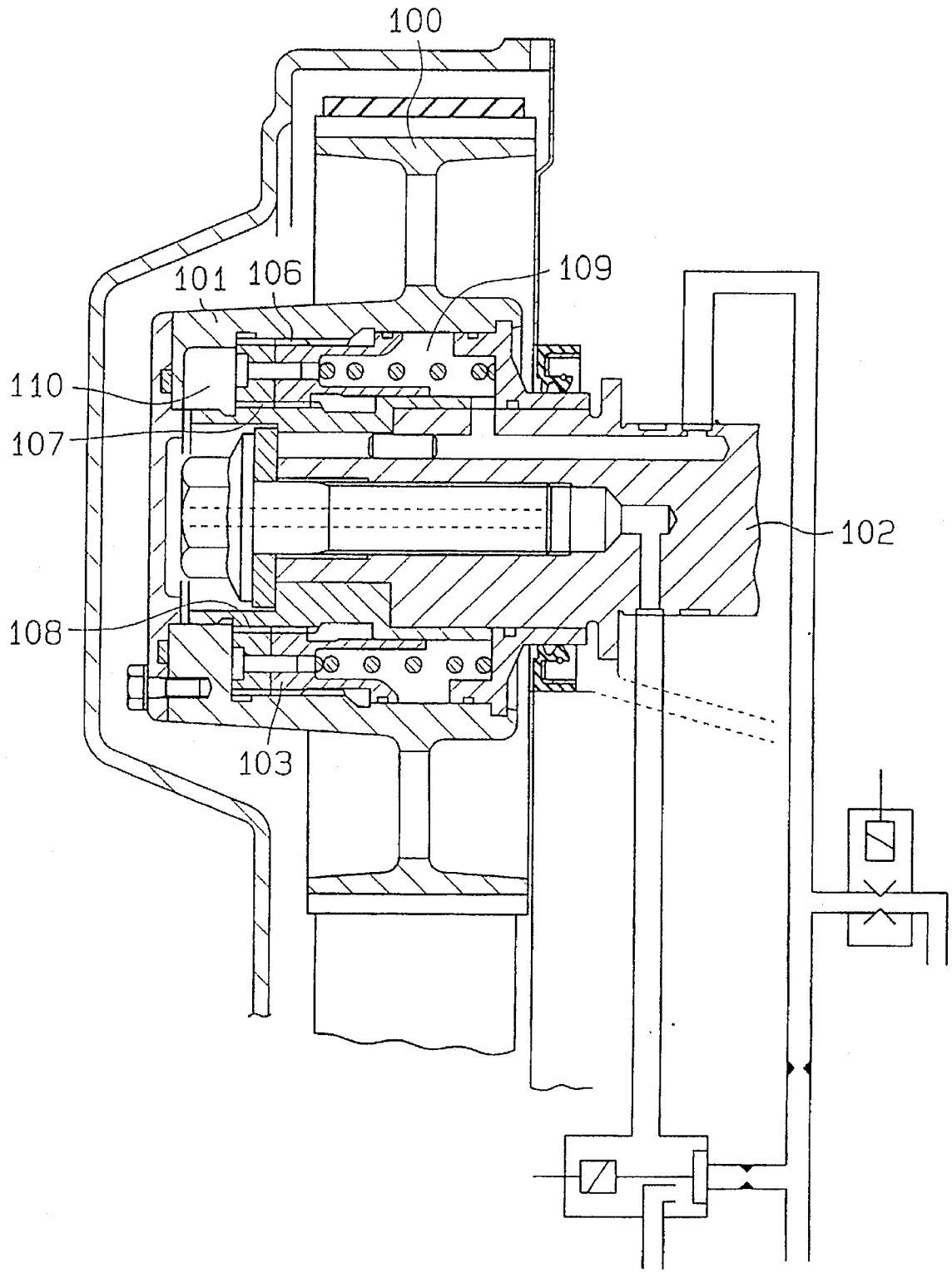
FIG. 7 is a schematic structural diagram showing a VVT and its peripheral structure according to prior art.

The second embodiment of this invention will be now described with reference to FIG. 6.

This embodiment is designed to mainly cope with the generation of a hitting sound when the timing pulley 17, which is arranged with a slight clearance to the sleeve 31, hits against the sleeve 31. This is caused by the spool 35 coupled to the housing 34 through the spline connection. The housing 34 receives force from the moving spool 35 and moves together with the spool 35. This results in the movement of the pulley 17 which is secured to the housing 34 and the sleeve 31.

First, the target valve timing TVT is calculated based on the idle signal ID, the shift position SP, etc. in step 201. The process in step 201 is exactly the same as that in step 101.

The actual valve timing VT of the TVT 30 is calculated from the values detected by the cam angle sensor 58 and the crank angle sensor 57 in step 202. It is determined in step 203 if the target valve timing TVT=0° CA. When the target valve timing TVT is not equal to 0° CA, the plunger 35 does not move to abut the housing 34. Accordingly, the pulley 17, which moves based on the movement of the plunger 35, does not travel up to the housing 34. Thus, the normal duty control is performed in step 206.

When the target valve timing TVT=0° CA, the pulley 17 moves until it hits against the sleeve 31. It is therefore necessary to suppress a hitting sound which is generated by the abutment of the pulley 17 and the sleeve 31. At this time, more fine duty control is executed in accordance with the viscosity of oil.

When the temperature is low, oil has a high viscosity and serves as a kind of a damper so that a hitting sound is hardly generated even when the pulley 17 abuts on the sleeve 31. In the cooling period where the temperature of oil is low, it is necessary to set the target valve timing TVT to the slowest timing to reduce the period of overlap in order to secure the combustion stability of the engine 1.

In step 204, it is determined whether or not the coolant temperature THW detected by the coolant temperature sensor 63 is equal to or greater than d° C. In other words, the coolant temperature THW proportional to the oil temperature is detected. When the coolant temperature THW is greater than d° C., the target valve timing TVT is reset to e° CA in step 205. The target valve timing TVT=e° CA means a valve timing slightly faster than the slowest valve timing while an increase in the internal EGR amount is suppressed as much as possible in the area of the engine speed NE which requires the slowest valve timing.

More specifically, when the viscosity of oil becomes low when the temperature is high, making it likely to generate a hitting sound when the timing pulley 17 abuts on the sleeve 31. Therefore, a new valve timing is to be computed. This valve timing is slightly faster than the slowest valve timing at which the timing pulley 17 abuts on the sleeve 31. Accordingly, the pulley 17 is prevented from abutting on the sleeve 31, and thus the generation of a hitting sound is prevented.

In step 206, the drive duty cycle DVT is calculated from the following equation based on the difference between the actual valve timing VT and the target valve timing TVT.

$$DVT=GDVTH+K\times(TVT-VT)$$

where GDVTH represents a hold duty value for holding the plunger 35 of the VVT at an arbitrary position and K represents the value of a proportional control gain.

Then, the acquired drive duty cycle DVT is output and the feedback control of the VVT 30 is performed to converge the actual valve timing VT to the target valve timing TVT. When the actual valve timing VT coincides with the target valve timing TVT, a signal indicative of the specific duty cycle GDVTH is output. Consequently, the VVT 30 is controlled with the target valve timing TVT.

When the coolant temperature THW is lower than d° C. in step 204, a value obtained by subtracting the offset amount α, which varies based on the engine speed NE, from the specific duty cycle GDVTH is stored as the drive duty cycle DVT in step 207.

In accordance with the drive duty cycle DVT computed in this manner, the OCV 41 is controlled so that the hydraulic pressure in the second pressure chamber 37 becomes greater than that in the first pressure chamber 36. The difference between the pressures in the pressure chambers 36, 37 increases in proportional to the offset amount α. As a result, the difference between both pressure chambers 36, 37 causes the plunger 35 to move and presses it against the housing 34.

The offset amount α or the force which presses the plunger 35 against the housing 34 is changed in accordance with the engine speed NE as per the first embodiment. To shift the plunger 35, therefore, the OCV 41 should be so controlled as to cancel the small difference between pressures in both pressure chambers 36, 37.

Suppose that the engine speed NE increases by operation of the acceleration pedal 4 when the vehicle is not in motion (the shift position SP being shown as "parking" or the like). In this case, the differential pressure between both chambers 36, 37 increases. The force which presses the plunger 35 against the housing 34 becomes greater than that when the engine is in a slow running mode. By increasing the surface pressure at the spline coupling portion, therefore, back-lash originated noise can be prevented.

According to this embodiment, as described above, when the oil temperature (coolant temperature THW) is greater than a predetermined value, i.e., when the oil viscosity is lower than a predetermined value, the target valve timing TVT for slightly advancing the cam shaft from its retarded position is computed. Accordingly, the timing pulley 17 does not abut on the sleeve 31.

In addition, when the oil viscosity is higher than the predetermined value, the timing pulley 17 abuts on the sleeve 31 so that the period of valve overlap can be reduced. In this case, the moving speed of the sleeve 31 is slow. Accordingly, a hitting sound is hardly generated even when the sleeve 31 abuts on the pulley 17. It is therefore possible to suppress the occurrence of a hitting sound while keeping the combustion stability in the engine 1.

This invention may also be embodied in the following forms without departing from the sprint or scope of the invention.

(1) The VVT 30 may be provided in the exhaust valve instead of the intake valve. The VVT 30 may also be provided in both valves.

(2) For computing the target valve timing TVT, parameters such as the throttle angle and the amount of intake air may be used.

(3) When the plunger 35 is shifted to the position where it abuts on the housing 34 or the position closest to the housing 34, the offset value α is set to zero when the engine is idling. This further improves the mechanical response in the next routine.

(4) The offset amount c at the time of altering the specific duty cycle GDVTH is selected in accordance with the deviation of the actual valve timing VT from the actual valve timing for the maximum lagged angle.

Therefore, the present examples and embodiments are to be considered as illustrative and not restrictive and the invention is not to be limited to the details given herein, but may be modified within the scope of the appended claims.

What is claimed is:

1. A valve timing control apparatus for an engine having an intake valve and an exhaust valve alternately opened and closed in a valve timing sequence according to a rotation of a cam shaft coupled to a crank shaft by way of a rotatable member securely mounted on the cam shaft, wherein said cam shaft is rotatable in synchronism with the crank shaft of the engine, wherein said cam shaft is arranged to be selectively advanced and retarded between two opposite limits with respect to the crank shaft so as to converge the valve timing sequence to a target value computed based on a running condition of the engine detected by detecting means which includes a sensor for detecting a rotational speed of the engine, said apparatus comprising:

a sleeve secured to the cam shaft within the rotatable member;

a first pressure chamber and a second pressure chamber sealed with respect to each other in the rotatable member;

a hollow plunger movable between the first pressure chamber and the second pressure chamber, said plunger having an inner surface and an outer surface respectively in mesh with the sleeve and the rotatable member, said plunger being arranged to move in an axial direction between a first extreme position in the first pressure chamber and a second extreme position in the second pressure chamber to selectively advance and retard the cam shaft based on differential pressure between the first pressure chamber and the second pressure chamber, wherein said cam shaft is advanced to one of said limits when said plunger is in the first extreme position and retarded to the other one of said limits when the cam shaft is in the second extreme position;

supplying means for supplying fluid pressure to the first pressure chamber and the second pressure chamber to move the plunger;

a controller for controlling the supplying means, said controller computing a specific control value to adjust the fluid pressure to be supplied to the first pressure chamber and the second pressure chamber so as to keep the valve timing sequence converged to the target value, said controller correcting said specific value based on the detected rotational speed of the engine when the plunger is in one of the extreme positions, wherein said controller adjusts the fluid pressures based on the corrected specific value.

2. The apparatus as set forth in claim 1, wherein said rotatable member includes:

a timing pulley mounted on the cam shaft to operably connect the cam shaft to the crank shaft; and a housing securely connected to the timing pulley and accommodating the plunger to define the first pressure chamber and the second pressure chamber.

3. The apparatus as set forth in claim 2 further comprising:

said plunger having an inner spline and an outer spline respectively formed in the inner surface and in the outer surface of the plunger;

said housing having an inner surface with a spline in mesh with the outer spline of the plunger to form a first spline connection;

said sleeve having an outer surface with a spline in mesh with the inner spline of the plunger to form a second spline connection; and at least one of the spline connections being a helical spline connection.

4. The apparatus as set forth in claim 3, wherein said supplying means comprises:

a first fluid passage connected to the first pressure chamber;

a second fluid passage connected to the second fluid passage;

an electromagnetic valve actuated by the controller to adjust a flow amount in each of said fluid passages.

5. The apparatus as set forth in claim 4, wherein said controller computes an offset value based on the rotational speed of the engine, wherein said offset value is proportionally variable to the rotational speed of the engine, and wherein said specific control value is indicative of a specific duty cycle to be corrected by the offset value so as to hold a plunger in a desired position and converge the valve timing to the specific value.

6. The apparatus as set forth in claim 5, wherein said timing pulley is spaced from the sleeve by a gap so as to be rotatable with the housing.

7. The apparatus as set forth in claim 6 further including a second sensor for detecting a coolant temperature proportional to a temperature of the fluid supplied to the first pressure chamber and the second pressure chamber, wherein the controller computes a viscosity of the fluid based on the coolant temperature and determines the computed viscosity to be greater than a predetermined value.

8. The apparatus as set forth in claim 7, wherein said controller corrects the target value to slightly advance the cam shaft from the second limit based on the viscosity greater than the predetermined value.

9. A valve timing control apparatus for an engine having an intake valve and an exhaust valve alternately opened and closed in a valve timing sequence according to a rotation of a cam shaft coupled to a crank shaft by way of a rotatable member securely mounted on the cam shaft, wherein said cam shaft is rotatable in synchronism with the crank shaft of the engine, wherein said cam shaft is arranged to be selectively advanced and retarded between two opposite limits with respect to the crank shaft so as to converge the valve timing sequence to a target value computed based on a running condition of the engine detected by detecting means which includes a sensor for detecting a rotational speed of the engine, said apparatus comprising:

said rotatable member including a timing pulley mounted on the cam shaft to operably connect the cam shaft to the crank shaft and a housing securely connected to the timing pulley and accommodating the plunger to define the first pressure chamber and the second pressure chamber;

a sleeve secured to the cam shaft within the housing;

said plunger having an inner spline and an outer spline respectively formed in the inner surface and in the outer surface of the plunger;

said housing having an inner surface with a spline in mesh with the outer spline of the plunger to form a first spline connection;

a first pressure chamber and a second pressure chamber sealed with respect to each other in the rotatable member;

a hollow plunger movable between the first pressure chamber and the second pressure chamber, said plunger having an inner surface and an outer surface respectively in mesh with the sleeve and the rotatable member, said plunger being arranged to move in an axial direction between a first extreme position in the first pressure chamber and a second extreme position in the second pressure chamber to selectively advance and retard the cam shaft based on differential pressure between the first pressure chamber and the second pressure chamber, wherein said cam shaft is advanced to one of said limits when said plunger is in the first extreme position and retarded to the other one of said limits when the cam shaft is in the second extreme position;

a first fluid passage connected to the first pressure chamber;

a second fluid passage connected to the second fluid passage;

an electromagnetic valve for adjusting a flow amount in each of said fluid passages to move the plunger;

a controller for controlling the electromagnetic valve, said controller computing a specific control value to adjust the fluid pressure to be supplied to the first pressure chamber and the second pressure chamber so as to keep the valve timing sequence converged to the target value, said controller correcting said specific value based on the detected rotational speed of the engine when the plunger is in one of the extreme positions, wherein said controller adjusts the fluid pressures based on the corrected specific value.

10. The apparatus as set forth in claim 9 further comprising:

said plunger having an inner spline and an outer spline respectively formed in the inner surface and in the outer surface of the plunger;

said housing having an inner surface with a spline in mesh with the outer spline of the plunger to form a first spline connection;

said sleeve having an outer surface with a spline in mesh with the inner spline of the plunger to form a second spline connection; and at least one of the spline connections being a helical spline connection.

11. The apparatus as set forth in claim 10, wherein said controller computes an offset value based on rotational speed of the engine, wherein said offset value is proportionally variable to the rotational speed of the engine, and wherein said specific control value is indicative of a specific duty cycle to be corrected by the offset value so as to hold a plunger in a desired position and converge the valve timing to the specific value.

12. The apparatus as set forth in claim 11, wherein said timing pulley is spaced from the sleeve by a gap so as to be rotatable with the housing.

13. The apparatus as set forth in claim 12 further including a second sensor for detecting a coolant temperature proportional to a temperature of the fluid supplied to the first pressure chamber and the second pressure chamber, wherein the controller computes a viscosity of the fluid based on the coolant temperature and determines the computed viscosity to be greater than a predetermined value.

14. The apparatus as set forth in claim 13, wherein said controller corrects the target value to slightly advance the cam shaft from the second limit based on the viscosity greater than the predetermined value.

15. A valve timing control apparatus for an engine having an intake valve and an exhaust valve alternately opened and closed in a valve timing sequence according to a rotation of a cam shaft coupled to a crank shaft by way of a rotatable member securely mounted on the cam shaft, wherein said cam shaft is rotatable in synchronism with the crank shaft of the engine, wherein said cam shaft is arranged to be selectively advanced and retarded between two opposite limits with respect to the crank shaft so as to converge the valve timing sequence to a target value computed based on a running condition of the engine detected by detecting means which includes a sensor for detecting a rotational speed of the engine, said apparatus comprising:

said rotatable member including a timing pulley mounted on the cam shaft to operably connect the cam shaft to the crank shaft and a housing securely connected to the timing pulley and accommodating the plunger to define the first pressure chamber and the second pressure chamber;

a sleeve secured to the cam shaft within the housing;

a first pressure chamber and a second pressure chamber sealed with respect to each other in the rotatable member;

a hollow plunger movable between the first pressure chamber and the second pressure chamber, said plunger having an inner surface and an outer surface respectively in mesh with the sleeve and the rotatable member, said plunger being arranged to move in an axial direction between a first extreme position in the first pressure chamber and a second extreme position in the second pressure chamber to selectively advance and retard the cam shaft based on differential pressure between the first pressure chamber and the second pressure chamber, wherein said cam shaft is advanced to one of said limits when said plunger is in the first extreme position and retarded to the other one of said limits when the cam shaft is in the second extreme position, said plunger having an inner spline and an outer spline respectively formed in the inner surface and in the outer surface of the plunger;

said housing having an inner surface with a spline in mesh with the outer spline of the plunger to form a first spline connection;

said sleeve having an outer surface with a spline in mesh with the inner spline of the plunger to form a second spline connection; and at least one of the spline connections being a helical spline connection;

a first fluid passage connected to the first pressure chamber;

a second fluid passage connected to the second fluid passage;

an electromagnetic valve for adjusting a flow amount in each of said fluid passages to move the plunger; and a controller for controlling the electromagnetic valve, said controller computing a specific control value to adjust the fluid pressure to be supplied to the first pressure chamber and the second pressure chamber so as to keep the valve timing sequence converged to the target value, said controller correcting said specific value based on the detected rotation speed of the engine when the plunger is in one of the extreme positions, wherein said controller adjusts the fluid pressures based on the corrected specific value, wherein said controller computes an offset value based on the rotational speed of the engine, wherein said offset value is proportionally variable to the rotational speed of the engine, and wherein said specific control value is indicative of a specific duty cycle to be corrected by the offset value so as to hold a plunger in a desired position and converge the valve timing to the specific value.

16. The apparatus as set forth in claim 15, wherein said timing pulley is spaced from the sleeve by a gap so as to be rotatable with the housing.

17. The apparatus as set forth in claim 16 further including a second sensor for detecting a coolant temperature proportional to a temperature of the fluid supplied to the first pressure chamber and the second pressure chamber, wherein the controller computes a viscosity of the fluid based on the coolant temperature and determines the computed viscosity is greater than a predetermined value.

18. The apparatus as set forth in claim 17, wherein said controller corrects the target value to slightly advance the cam shaft from the second limit based on the viscosity greater than the predetermined value.

* * * * *